United States Patent Office 2,936,786
Patented May 17, 1960

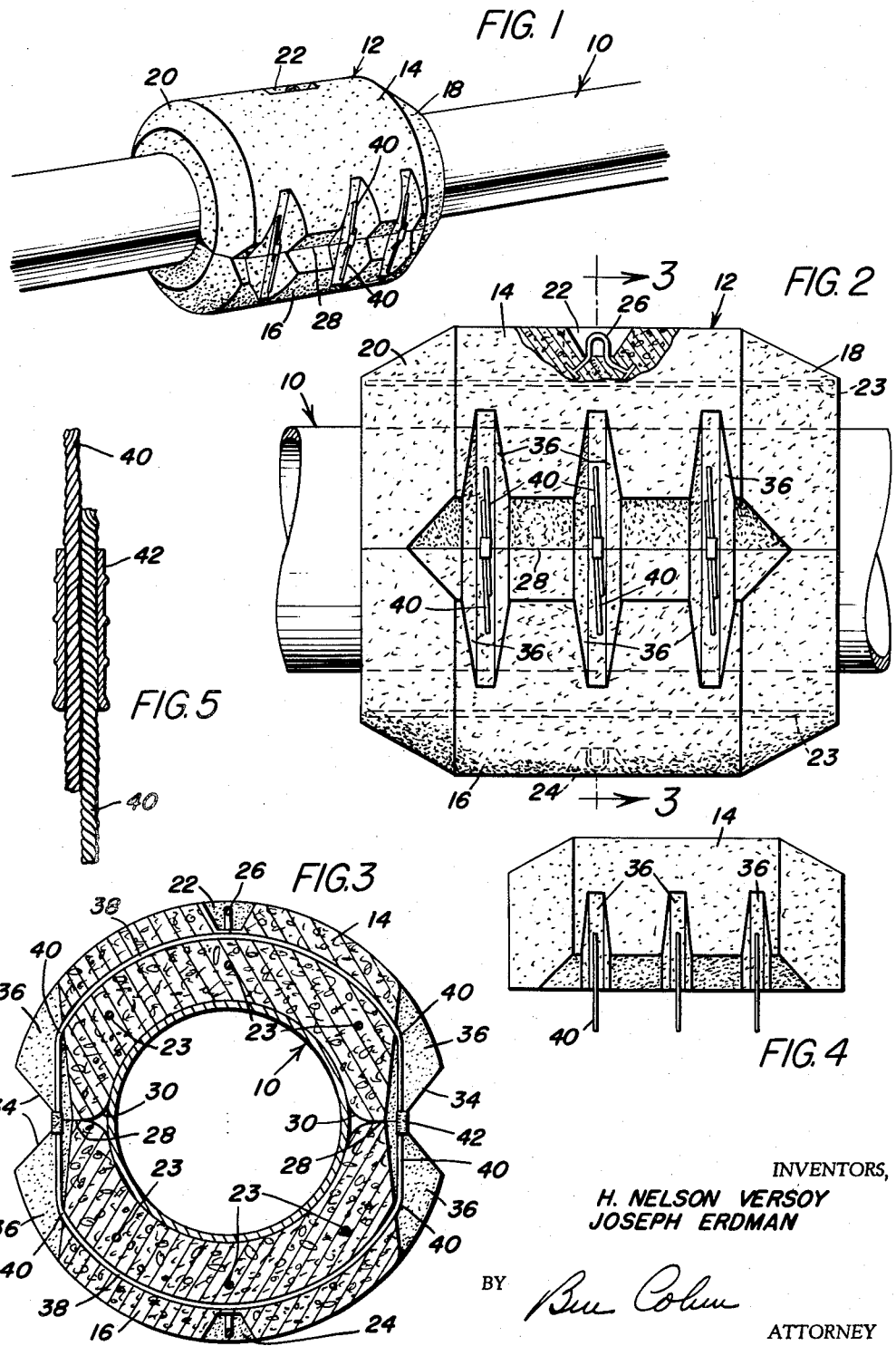

2,936,786

RIVER WEIGHT

Harry Nelson Versoy and Joseph Erdman, Harvey, La.

Application November 18, 1957, Serial No. 697,151

3 Claims. (Cl. 138—25)

This invention relates generally to weights of the type used to anchor conduits such as pipe lines in the bottom of rivers or other bodies of water, and more particularly to a weight constructed from a cast material, preferably concrete since such material is of satisfactory weight and comparatively inexpensive.

In the laying of pipe lines such as those used for the transmission of oil or natural gas, it is necessary to provide means for weighing down or anchoring such lines or conduits wherever they cross a body of water such as a river, stream or the like. The weight used for this purpose should be structurally strong, readily installed on the pipe line or conduit with which it is being used, and preferably should incorporate means whereby the weight may be installed in the field in a ready and expeditious manner. The feature of ready field installation permits the sections of the pipe line or conduit to be handled and transported independently of the weights thus permitting installation equipment to be kept down to a minimum size and obviating damage to the weights during transport whereby if the weights have been installed on the line prior to reaching the destination at which they are going to be installed, damaged weights would have to be removed and replaced accordingly causing delays in laying the line and inefficient operation.

Accordingly, a primary object of this invention is to provide a new and improved river weight comprising a pair of mating halves to be disposed in circumposed relationship about a conduit to be anchored in a body of water, said mating halves including novel fastening means facilitating installation of the weights in the field.

Another object of this invention is to provide a river weight comprising a pair of symmetrical readily cast semi-cylindrical mating members wherein said mating members include cooperating continuous linear abutting longitudinal edge portions cooperating with a plurality of elongated flexible retaining elements anchored at one end in the mating halves above the abutting edge portions and below the outer surface of the river weight, the mating members including recessed portions spaced longitudinally thereof from which the retaining elements extend, said retaining elements being disposed in overlapped pairs when installed facilitating the application of a compressible clamp element in the field.

Other objects and advantages of this invention will become apparent from the consideration of the following description, taken in connection with the accompanying drawing, wherein an exemplary embodiment of this invention is disclosed.

In the drawing:

Figure 1 is a perspective view of a river weight installed on a section of conduit;

Figure 2 is a side elevation of the assembled river weight;

Figure 3 is a section taken on line 3—3 of Figure 2;

Figure 4 is a side elevation of one of the halves of the river weight; and

Figure 5 is an enlarged fragmentary view of a clamping element in crimped relationship on the fastening elements of the river weight, with the clamping element being shown in section for clarity.

Referring to the drawing, a section of a pipe line to be anchored is indicated generally at 10, the section of pipe line having installed thereon one of a plurality of river weights indicated generally at 12.

The river weight comprises a pair of semi-cylindrical hollow mating members 14 and 16, each of which being tapered at its opposite end to form frustro-conical ends 18 and 20 on the river weight to reduce resistance of the river weight to motion through water or through obstructions in water or ditches when the pipe line section is being moved into position to be laid.

The mating halves are manufactured from concrete in suitable forms including longitudinally extending reinforcing rods 23, see Figure 3, and have imbedded in longitudinally extending recesses 22 and 24, respectively, suitably anchored hook elements 26, see Figure 2, for engagement with a suitable sling or lifting apparatus (not shown).

The members 14 and 16 at their longitudinal edges will be in continuous abutting relationship as indicated at 28. The longitudinal edges of the mating halves adjacent the inner surface thereof will be arcuate or relieved as indicated at 30 to eliminate sharp edges preventing damage to the conduit upon which the weight is being installed. If preferred a suitable liner or shield may be circumposed about that portion of the conduit upon which the weight is being installed and this shield may conveniently take the form of a pair of semi-cylindrical mating portions. Each of the mating halves may diverge from their longitudinal edges as indicated at 34 to facilitate crimping of a clamp element to subsequently be described.

Formed in the surface of the mating halves normal to the longitudinal edge portions thereof is a plurality of aligned longitudinally spaced recessed portions 36 which open into the longitudinal edge of the mating halves above the longitudinal abutting portions thereof. Imbedded in the mating halves below their longitudinal abutting edge portions and above the outer surface thereof is the intermediate body portion of flexible retaining elements 38, each of which being in alignment with an aligned pair of the recessed portions 36. The free or terminal ends 40 of the retaining elements extend across and above the longitudinal abutting edge portions in overlapped relationship as most clearly seen in Figure 5. The flexible retaining elements may take the form of steel cables. Indicated at 42 is a suitable clamping element which will be circumposed about intermediate overlapped portions of the flexible retaining elements 40 by means of a suitable crimping tool. The cables and clamp element will be made from a suitable corrosion resistant material.

It will be noted that when the river weight is installed tension applied to the retaining elements 40 will retain the mating halves in their assembled relationship causing pressure to be placed on the mating halves to be distributed continuously and even along the abutting longitudinal edge portions as indicated at 28.

The individual halves, as shown in Figure 4, will be transported to the field independently of the sections of pipe line or conduit. In some instances one of the halves may be used as a "saddle" when the line crosses swamps or river bottoms where little or no current is expected to be encountered.

After arriving in the field, the overlapping retaining elements at one edge of the cooperating halves will be secured together. A suitable sling will be connected to the hooks 26 and the river weight will be lowered on the section of conduit, the connected elements at the one side of the mating halves serving as a hinge. When the weight is lowered on the section of conduit the weight of the concrete will cause the two halves to fold toward each other and thereafter the overlapping retaining elements at the other side edge of the river weight may be secured by means of a suitable crimping tool.

It will be noted that in addition to the equal distribution of pressure applied to the mating halves through the utilization of the flexible retaining elements and clamp elements, the fastening elements and hooks are disposed beneath the outer surface of the river weight when assembled on the conduit tending to eliminate the danger of the weight catching on rocks or the like when the pipe line is being installed.

The relieved arcuate longitudinal edge portions 30, when the river weight is being installed, will tend to eliminate damage to the conduit when the weight is being lowered by means of the previously mentioned sling.

The form of the invention shown and described is intended to be taken as a preferred example of the same, and various changes in size, shape and arrangement of parts may be made as do not depart from the spirit of the invention and the scope of the appended claims.

What is claimed as new is as follows:

1. A river weight for anchoring a conduit in a body of water, said weight comprising a pair of semi-cylindrical similar mating members for circumposed disposition about a conduit to be anchored, each of said mating members including a pair of similar, uninterrupted, longitudinal abutment-edge portions linearly engageable with a similar abutment-edge portion for defining a complete cylinder about a conduit, said mating members including above said abutment-edge portions, a relieved edge portion extending away from said abutment-edge portions and merging into the outer surface of said members, elongated, flexible fastening elements imbedded in said mating members and extending intermediate of said relieved portions above said abutment-edge portions and below the outer surface of said mating members, said fastening elements at each abutment-edge including a free terminal edge alignable longitudinally with another free terminal end of another fastening element, and manually applicable clamp elements engageable with intermediate portions of said free terminal ends to draw the abutment-edge portions of the mating members into abutting relationship under pressure.

2. The structure as set forth in claim 1 including recessed portions in the mating members normal to the abutting-edge portions and opening into said relieved portions and outer surface of said mating members, each of the terminal ends of a fastening element extending through one of said recessed portions, the recessed portions of the pair of mating members forming a tangential slot on the completed cylinder facilitating application of the clamp elements by means of a crimping tool.

3. The structure of claim 1 in which said mating members comprise a moldable material, said flexible fastening elements and clamp elements comprise a non-corrosive material, recessed hook elements imbedded in said mating member intermediate each of the abutment-edge portions, and longitudinal reinforcing rod extending through said mating members.

References Cited in the file of this patent

UNITED STATES PATENTS

| 760,265 | Smith | May 4, 1904 |
| 780,843 | Wallace | Jan. 24, 1905 |
| 1,486,414 | Brier | Mar. 11, 1924 |
| 1,624,191 | Venzie | Apr. 12, 1927 |
| 2,662,552 | Rowe et al. | Dec. 15, 1953 |
| 2,791,019 | Du Laney | May 7, 1957 |

FOREIGN PATENTS

| 17,447 | Great Britain | Jan. 22, 1914 |